June 8, 1926. 1,587,862
A. RUTISHAUSER ET AL
MOWING MACHINE
Filed April 28, 1924 2 Sheets-Sheet 1
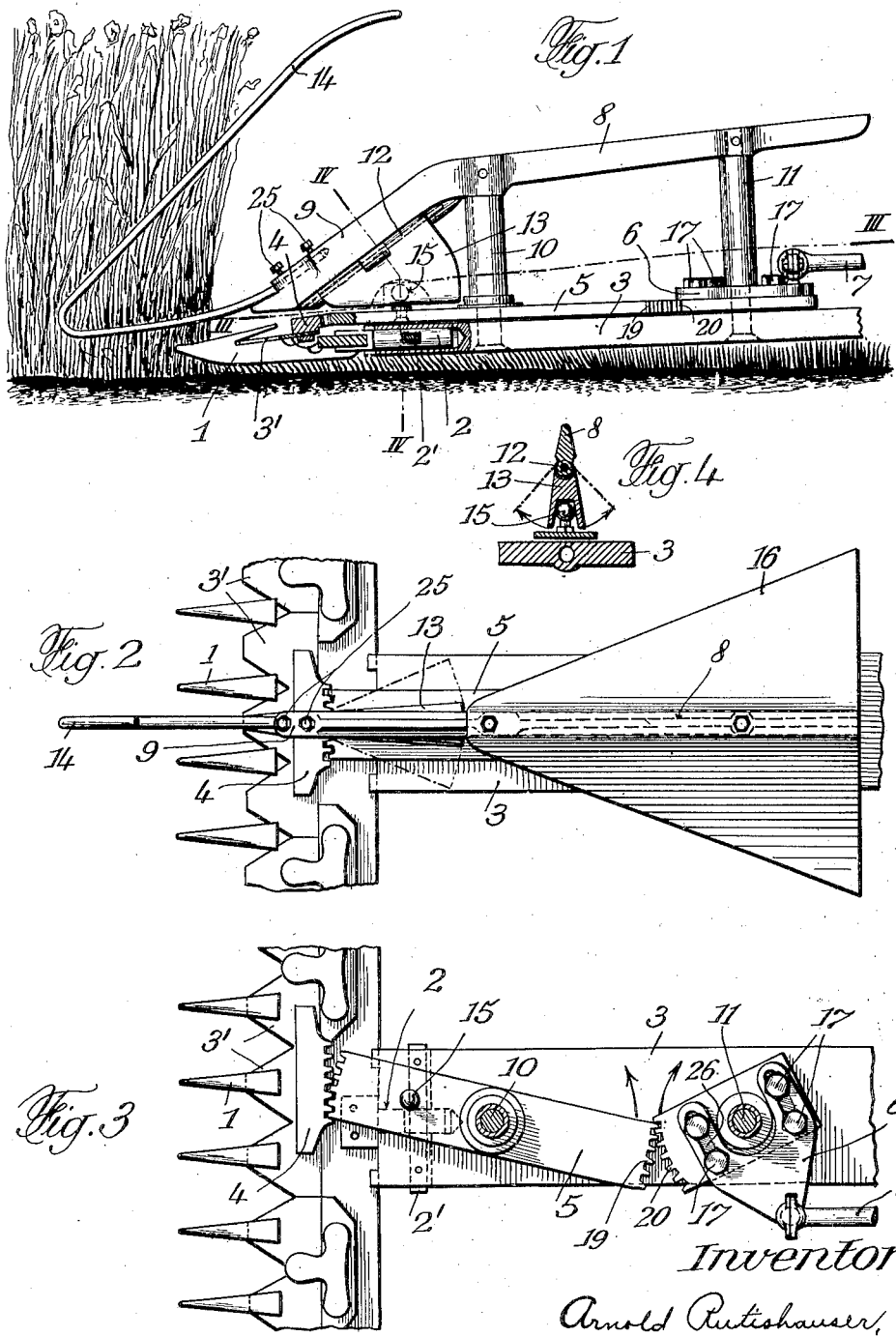

June 8, 1926.
A. RUTISHAUSER ET AL
1,587,862
MOWING MACHINE
Filed April 28, 1924    2 Sheets-Sheet 2
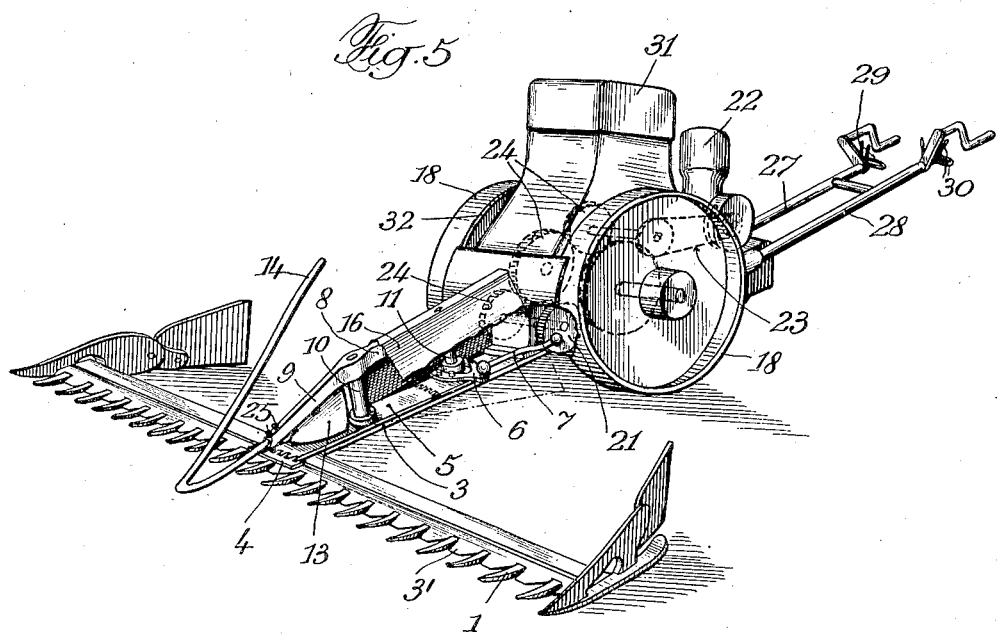
Inventors:
Arnold Rutishauser
Jacob Fahrni Patented June 8, 1926.

1,587,862

UNITED STATES PATENT OFFICE.

ARNOLD RUTISHAUSER, OF OLTEN, AND JACOB FAHRNI, OF ZURICH, SWITZERLAND, ASSIGNORS TO EISEN- & STAHLWERKE OEHLER & CO. A.-G., OF AARAU, SWITZERLAND.

MOWING MACHINE.

Application filed April 28, 1924, Serial No. 709,556, and in Switzerland March 25, 1924.

The present invention refers to improvements in mowing machines of the type in which there is provided a cutter frame transversely arranged on a central cantilevered frame part and a blade moved to and fro by the movement of the cutter blade for diverting the falling cut material and distributing it into two swaths. With the known mowing machines of this type the distributing blade has been connected to the cutter blade or it has been arranged in an upright position on an oscillating lever carried by the frame part, so that the movement of the front edge of the distributing blade adjacent to the material to be cut shows the largest amplitude; the absolute path along which said front edge moves when the mowing machine travels corresponds to a sine curve. With these constructions the height of the distributing blade must be kept comparatively small owing to the inertia of its mass, therefore the distributing action is only effective when the material to be cut is short. Furthermore it is not possible to arrange in these constructions a rigidly fixed spike in front of the widely oscillating distributing blade as on account of the above mentioned movement of the distributing blade along a sine curve an entangling of the cut material would occur.

In order to distribute also high and entangled cut material in the desired manner, i. e. into two swaths, according to the present invention the distributing blade is swingably mounted on an axis lying in the longitudinal direction of the frame part and decreases in height towards the front so that the amplitude of its movement increases from fore to aft.

The shape of the distributing blade may be so chosen that the amplitude of the movement of its front edge is nearly nil, while on the other hand it is possible thereby to arrange a rigidly fixed member in front of the distributing blade serving to assist in distributing the cut material.

A constructional example of the subject matter of the present invention is illustrated on the accompanying drawings, in which:

Fig. 1 is a side elevation with parts shown in section.

Fig. 2 is a plan view,

Fig. 3 is a plan view with parts shown in section along line III—III in Fig. 1,

Fig. 4 is a cross-section along line IV—IV in Fig. 1 and

Fig. 5 is a perspective view of the whole mowing machine.

Referring now to the drawings, 1 denotes the knife-beam provided in the middle of its length with a gudgeon 2 by means of which the knife-beam 1 is swingably mounted in a vertical plane in the frame part 3. The gudgeon is held in position by a key 2' the necessary clearance being provided between key and key slot to permit an adjusting movement of the knife-beam relatively to the frame part 3. The latter is arranged in the longitudinal centre plane of the machine so that the cutting mechanism is situated in front of the running wheels 18. 3' designates the knife to which a reciprocating movement is imparted through the intermediary of a toothed rack 4 and a two-armed swinging lever 5. The latter is provided at its rear end with a toothed segment 19 co-operating with a toothed segment 20 of the actuating lever 6 to which an oscillatory movement about the pin 11 is imparted by a connecting rod 7 operatively connected to a crank disc 21. The crank disc 21 is rotated by the motor 22 through the interposition of a chain drive 23 and gear wheels 24. The drive of the wheels 18 by the motor is diagrammatically indicated by the gearwheel 32 co-operating with one of the wheels 24. 8 denotes a carrier extending in the longitudinal direction of the frame 3 and provided in front with a part 9 sloping in the downward direction. The carrier 8 is rigidly connected by the two pins 10 and 11 to the frame 3; the pins 10 and 11 serve as fulcrums of the swinging levers 5 and 6 respectively.

Below the oblique part 9 of the carrier 8 the pintle 12 of the distributing blade 13 is arranged extending in the same direction as the oblique part 9 and being protected by the latter against the falling cut material. The distributing blade 13 is of an approximate triangular shape when seen in elevation. The front end of the stationary carrier 8, 9 encloses to some extent the triangular distributing blade. In the end of the sloping part 9 a horn shaped member 14 is inserted and fixed thereto by means of screw bolts 25 so that the horn can be exchanged. The horn 14 situated in front of the distributing blade 13, causes a diversion of the uncut material, and the horn eventually effects a disentanglement of the upper ends of the material by the free rearwardly projecting end of the latter.

The distributing blade 13 is oscillated about its pintle 12 by the action of a spherical pin 15 fixed to the swinging lever 5 and projecting into a recess provided in the lower part of the blade 13 (Fig. 4). The amplitude of the oscillating movement of the front end of the distributing blade 13 is quite small but it increases towards the rear in accordance with the increased distance of the points of the lower longitudinal edge of the blade from the pivot, whereby the distribution effect of the blade is enhanced.

The roof-shaped divider 16 of sheet-iron is fixed to the carrier 8 and serves for deviating the cut material from the driving parts arranged at the rear of the distributing blade 13.

The driving lever 6 consists of two parts connected together by means of screw bolts 17 passing through slots 26, this connection enables an alteration of the leverage and variation of the stroke of the reciprocating movement of the cutting blade.

The steering of the above described mowing machine is effected by hand by means of the upwardly projecting shafts 27 and 28 on which the levers 29, 30 for controlling the motor are arranged. 31 is the tank for the motor fuel. The mowing machine can be easily handled by one person and it is very efficient in cutting grass, corn and the like.

We claim,

1. In a mowing machine, the combination with a wheeled frame having a middle, forwardly projecting part, a carrier supported thereover and having its forward end downwardly inclined, a pintle on said end, a substantially triangular plate mounted on said pintle, means to oscillate said plate and a divider at the rear of said plate, whereby a swath is laid to both sides of said part.

2. In a mowing machine, the combination with a wheeled frame having a middle, forwardly projecting part and cutting mechanism carried across the front end of said part; of a horn projecting from said part in front of the cutter mechanism, a substantially triangular blade, means to pivot said blade on an inclined side, and a divider stationary with respect to said part, said blade being mounted between said horn and divider in a substantially vertical plane over said part.

3. In a mowing machine, the combination with a wheeled frame having a middle forwardly projecting part and cutter mechanism supported on the free end of said part with the ends of said mechanism extending to both sides of said part, and cutter vibrating mechanism; of a horn projecting from said middle part in front of the cutter mechanism, a substantially triangular blade hinged along one of its sides over said part, a pin and slot connection between the cutter vibrating mechanism and said blade to vibrate the blade in unison with the cutter mechanism, and a stationary divider to the rear of said blade.

4. In a mowing machine, the combination with a wheeled frame having a middle, forwardly projecting part, a cutter mechanism mounted at its middle on said part, and vertical pins projecting from said part; of a carrier mounted on said pins and having a downwardly sloping front end, a forwardly projecting horn mounted on said sloping front end of the carrier, a triangular plate pivoted on one edge on said sloping end, a cutter operating device carried by said frame part, and means on said device to vibrate said plate.

5. In a mowing machine, the combination with a wheeled frame having a middle, forwardly projecting part, and a cutter mechanism detachably and pivotally mounted at its middle on the end of said part including a knife beam and a knife; of a rack on the knife, a carrier supported vertically above said part and having a downwardly sloping front end, a horn carried by said front end, a triangular plate pivoted on one edge to said sloping front end, a divider on said carrier to the rear of said plate, a swinging lever having toothed ends, one end engaging said rack, a pivoted toothed actuating lever engaging the opposite end of said swinging lever, and a pin and slot connection between the swinging lever and plate.

In testimony that we claim the foregoing as our invention, we have signed our names.

ARNOLD RUTISHAUSER.
JACOB FAHRNI.